United States Patent
Barker et al.

(10) Patent No.: US 8,537,984 B2
(45) Date of Patent: *Sep. 17, 2013

(54) VOICE OVER IP TELEPHONE RECORDING ARCHITECTURE

(75) Inventors: Kirk Barker, Scurry, TX (US); Darrell D. Roberts, Flower Mound, TX (US)

(73) Assignee: TeleStrat International, Ltd., Plano, TX (US)

( * ) Notice: Subject to any disclaimer, the term of this patent is extended or adjusted under 35 U.S.C. 154(b) by 1854 days.

This patent is subject to a terminal disclaimer.

(21) Appl. No.: 11/442,876

(22) Filed: May 30, 2006

(65) Prior Publication Data

US 2006/0233321 A1    Oct. 19, 2006

Related U.S. Application Data

(63) Continuation of application No. 10/065,028, filed on Sep. 11, 2002, now Pat. No. 7,054,420.

(51) Int. Cl.
*H04M 1/64* (2006.01)

(52) U.S. Cl.
USPC ...................................... 379/88.17

(58) Field of Classification Search
USPC ................................. 379/68, 88.17
See application file for complete search history.

(56) References Cited

U.S. PATENT DOCUMENTS

| | | | |
|---|---|---|---|
| 5,333,103 A | 7/1994 | Cvek | |
| 5,345,430 A | 9/1994 | Moe | |
| 5,535,261 A | 7/1996 | Brown et al. | |
| 5,818,907 A | 10/1998 | Maloney et al. | |
| 5,819,005 A | 10/1998 | Daly et al. | |
| 6,029,063 A | 2/2000 | Parvulescu et al. | |
| 6,072,645 A | 6/2000 | Sprague | |
| 6,122,665 A | 9/2000 | Bar et al. | |
| 6,209,025 B1 | 3/2001 | Bellamy | |
| 6,222,909 B1 * | 4/2001 | Qua et al. | 379/88.22 |
| 6,233,320 B1 | 5/2001 | Haimi-Cohen | |
| 6,233,389 B1 | 5/2001 | Barton et al. | |
| 6,263,147 B1 | 7/2001 | Tognazzini | |
| 6,269,361 B1 | 7/2001 | Davis et al. | |
| 6,363,440 B1 | 3/2002 | Stepp et al. | |
| 6,381,220 B1 * | 4/2002 | Kung et al. | 370/250 |
| 6,445,694 B1 | 9/2002 | Swartz | |
| 6,467,041 B1 * | 10/2002 | Blam | 713/310 |
| 6,661,879 B1 | 12/2003 | Schwartz et al. | |
| 6,668,044 B1 * | 12/2003 | Schwartz et al. | 379/68 |

(Continued)

OTHER PUBLICATIONS

"U.S. Appl. No. 10/065,028 Amendment and Response filed Sep. 16, 2005 to Non-Final Office Action mailed Jun. 16, 2005", 11 pgs.

(Continued)

*Primary Examiner* — Simon Sing
(74) *Attorney, Agent, or Firm* — Schwegman Lundberg & Woessner, P.A.

(57) ABSTRACT

A method and system is disclosed for on-demand recording of a voice session by a telephone recording device in a telecommunication network. After establishing a voice session between the telephone recording device and at least one communication device, a user of the telephone recording device may instruct it to store voice data during the voice session so long as the voice session has not been terminated. During the voice session, the telephone recording device processes and transmits the voice data to and saved at a storage server without going through a centrally located exchange device, wherein the saved voice data is available for on-demand replay.

14 Claims, 5 Drawing Sheets

(56) References Cited

U.S. PATENT DOCUMENTS

| | | | |
|---|---|---|---|
| 6,757,906 | B1 | 6/2004 | Look et al. |
| 6,778,639 | B2* | 8/2004 | Gusler et al. ............... 379/68 |
| 6,795,534 | B2* | 9/2004 | Noguchi ............... 379/88.17 |
| 6,850,691 | B1 | 2/2005 | Stam et al. |
| 7,054,420 | B2 | 5/2006 | Barker et al. |
| 7,149,415 | B2 | 12/2006 | Thiagarajan et al. |
| 7,499,530 | B2 | 3/2009 | Carroll et al. |
| 2001/0051037 | A1 | 12/2001 | Safadi et al. |
| 2002/0040475 | A1 | 4/2002 | Yap et al. |
| 2002/0067810 | A1 | 6/2002 | Barak et al. |
| 2002/0118798 | A1 | 8/2002 | Langhart et al. |
| 2002/0155847 | A1 | 10/2002 | Weinberg et al. |
| 2003/0223552 | A1 | 12/2003 | Schoeman |
| 2005/0207542 | A1 | 9/2005 | Carroll et al. |
| 2011/0235786 | A1 | 9/2011 | Barker |

OTHER PUBLICATIONS

"U.S. Appl. No. 10/065,028, Final Office Action mailed Mar. 26, 2004", 10 pgs.

"U.S. Appl. No. 10/065,028, Non-Final Office Action mailed Jun. 16, 2005", 10 pgs.

"U.S. Appl. No. 10/065,028, Non-Final Office Action mailed Sep. 22, 2004", 11 pgs.

"U.S. Appl. No. 10/065,028, Non-Final Office Action mailed Sep. 25, 2003", 9 pgs.

"U.S. Appl. No. 10/065,028, Notice of Allowance mailed Jan. 23, 2006", 6 pgs.

"U.S. Appl. No. 10/065,028, RCE and Response filed Jun. 23, 2004 to Final Office Action mailed Mar. 26, 2004", 11 pgs.

"U.S. Appl. No. 10/065,028, Response filed Dec. 22, 2004 to Non-Final Office Action mailed Sep. 22, 2004", 11 pgs.

"U.S. Appl. No. 10/065,028, Response filed Dec. 23, 2003 to Non-Final Office Action mailed Sep. 25, 2003", 10 pgs.

"U.S. Appl. No. 10/065,028, Response to Examiner's Statement of Reasons for Allowance filed Apr. 5, 2006", 1 pg.

"U.S. Appl. No. 10/146,168, Advisory Action mailed Sep. 6, 2006", 3 pgs.

"U.S. Appl. No. 10/146,168, Response filed Jul. 30, 2008 to Final Office Action mailed May 30, 2008", 6 pgs.

"U.S. Appl. No. 10/146,168, Advisory Action mailed Jun. 17, 2005", 2 pgs.

"U.S. Appl. No. 10/146,168, Amendment Accompanying RCE filed Apr. 23, 2004 to Final Office Action mailed Feb. 23, 2004", 6 pgs.

"U.S. Appl. No. 10/146,168, Amendment filed Oct. 8, 2004 to Non-Final Office Action mailed Jul. 9, 2004", 11 pgs.

"U.S. Appl. No. 10/146,168, Final Office Aciton mailed Mar. 14, 2005", 11 pgs.

"U.S. Appl. No. 10/146,168, Final Office Action mailed Feb. 23, 2004", 9 pgs.

"U.S. Appl. No. 10/146,168, Final Office Action mailed May 30, 2006", 9 pgs.

"U.S. Appl. No. 10/146,168, Final Office Action mailed May 30, 2008", 9 pgs.

"U.S. Appl. No. 10/146,168, Non Final Office Action mailed Jan. 3, 2007", 10 pgs.

"U.S. Appl. No. 10/146,168, Non Final Office Action mailed Dec. 1, 2005", 8 pgs.

"U.S. Appl. No. 10/146,168, Non-Final Office Action mailed Jul. 9, 2004", 9 pgs.

"U.S. Appl. No. 10/146,168, Non-Final Office Action mailed Aug. 28, 2003", 8 pgs.

"U.S. Appl. No. 10/146,168, Notice of Allowance mailed Oct. 22, 2008", 6 pgs.

"U.S. Appl. No. 10/146,168, Preliminary Amendment filed Sep. 12, 2005", 9 pgs.

"U.S. Appl. No. 10/146,168, Response filed Jun. 4, 2007 to Non Final Office Action mailed Jan. 3, 2007", 16 pgs.

"U.S. Appl. No. 10/146,168, Response filed Jul. 31, 2006 to Final Office Action mailed May 30, 2006", 11 pgs.

"U.S. Appl. No. 10/146,168, Response filed Nov. 24, 2003 to Non-Final Office Action mailed Aug. 28, 2003", 8 pgs.

"U.S. Appl. No. 10/146,168, Response filed Mar. 1, 2006 to Non Final Office Action mailed Dec. 1, 2005", 8 pgs.

"U.S. Appl. No. 10/146,168, Response filed Mar. 12, 2008 to Restriction Requirement mailed Sep. 12, 2007", 7 pgs.

"U.S. Appl. No. 10/146,168, Response filed May 16, 2005 to Final Office Action mailed Mar. 14, 2005", 22 pgs.

"U.S. Appl. No. 10/146,168, Restriction Requirement mailed Sep. 12, 2007", 6 pgs.

"U.S. Appl. No. 11/129,813, Non-Final Office Action mailed Oct. 14, 2008", 9 pgs.

"U.S. Appl. No. 11/129,813, Response filed Feb. 13, 2009 to Non Final Office Action mailed Oct. 14, 2008", 11 pgs.

"U.S. Appl. No. 10/146,168, Amendment Accompanying RCE filed Apr. 23, 2004", 6 pgs.

"U.S. Appl. No. 10/146,168, Non Final Office Action mailed Aug. 28, 2003", 8 pgs.

"U.S. Appl. No. 11/129,813, Final Office Action mailed Apr. 28, 2009", 12 pgs.

"ExecRecord—Overview of Cisco Call Manager Solution (promotional materials)", Eyretel PLC, (2001), 2 pgs.

U.S. Appl. No. 13/153,654, Non Final Office Action mailed Mar. 18, 2013, 12 pgs.

* cited by examiner

VOICE OVER IP TELEPHONE RECORDING ARCHITECTURE

This application is a continuation of U.S. patent application Ser. No. 10/065,028, filed Sep. 11, 2002, which issued on May 30, 2006 as U.S. Pat. No. 7,054,420.

BACKGROUND OF INVENTION

The present invention relates to a distributed network architecture for recording a stream of analog or digital data.

In the current state of the industry, in order to record the contents of a telephone call, computer transmission, television program, or any form or type of analog or digital data transmission, there are two basic methods. The first method is "logging," which consists of recording every transmission, from initiation until termination, regardless of the content or characteristics of the transmission. Because logging is independent of the contents and characteristics of the transmission, if a specific transmission is to be reviewed, it becomes necessary to record every transmission. Recording every transmission, however, requires a significant amount of storage space. Further, because of the number of transmissions recorded, it is difficult and time-consuming to locate a specific transmission.

The second method of recording a transmission is "event driven" recording, which records a transmission upon the occurrence of a certain condition or event. In some instances, the recording condition may be the start of the transmission (which is, in effect, the logging method), while in other instances the event will occur during the transmission (such as when a user presses a "record" button during the transmission). Other events may be time-based, such as when recording begins and ends at a specific times. One difficulty of an event driven recording system is properly defining the event that initiates recording. An overly broad event may record too many transmissions, while too specific of an event may not record enough. Another disadvantage of event driven recording is that the event may occur, or may occur at the wrong time, resulting in not all of the content of the transmission being recorded. Yet another disadvantage is that if the event cannot (or does not) occur until after the initiation of transmission, then the transmission that occurs prior to the event is not recorded. Further, for communications via computer instant messaging, a similar disadvantage occurs when the content of the conversation may "scroll off" the screen before the user can save the earlier portions of the conversation.

The above described recording methods all deal with a centralized network architecture. That is, the functional components that manage call control and voice transmission are all centrally located in a Private Branch Exchange (PBX) of a private network. More specifically, a recording initiation device such as a recording phone has to obtain all call control information and voice data for other phones in connection therewith from the PBX.

What is needed is distributed network architecture for recording voice data between telephones.

SUMMARY OF INVENTION

A method and system is disclosed for on-demand recording of a voice session by a telephone recording device in a telecommunication network. After establishing a voice session between the telephone recording device and at least one communication device, a user of the telephone recording device may instruct it to store voice data during the voice session so long as the voice session has not been terminated. During the voice session, the telephone recording device processes and transmits the voice data to and saved at a storage server without going through a centrally located exchange device, wherein the saved voice data is available for on-demand replay.

DETAILED DESCRIPTION

The following disclosure provides many different embodiments, or examples, for implementing different features of an on-demand recording system. Specific examples of components, processes, and implementations are described to help clarify the invention. These are, of course, merely examples and are not intended to limit the invention from that described in the claims.

Figure 1:
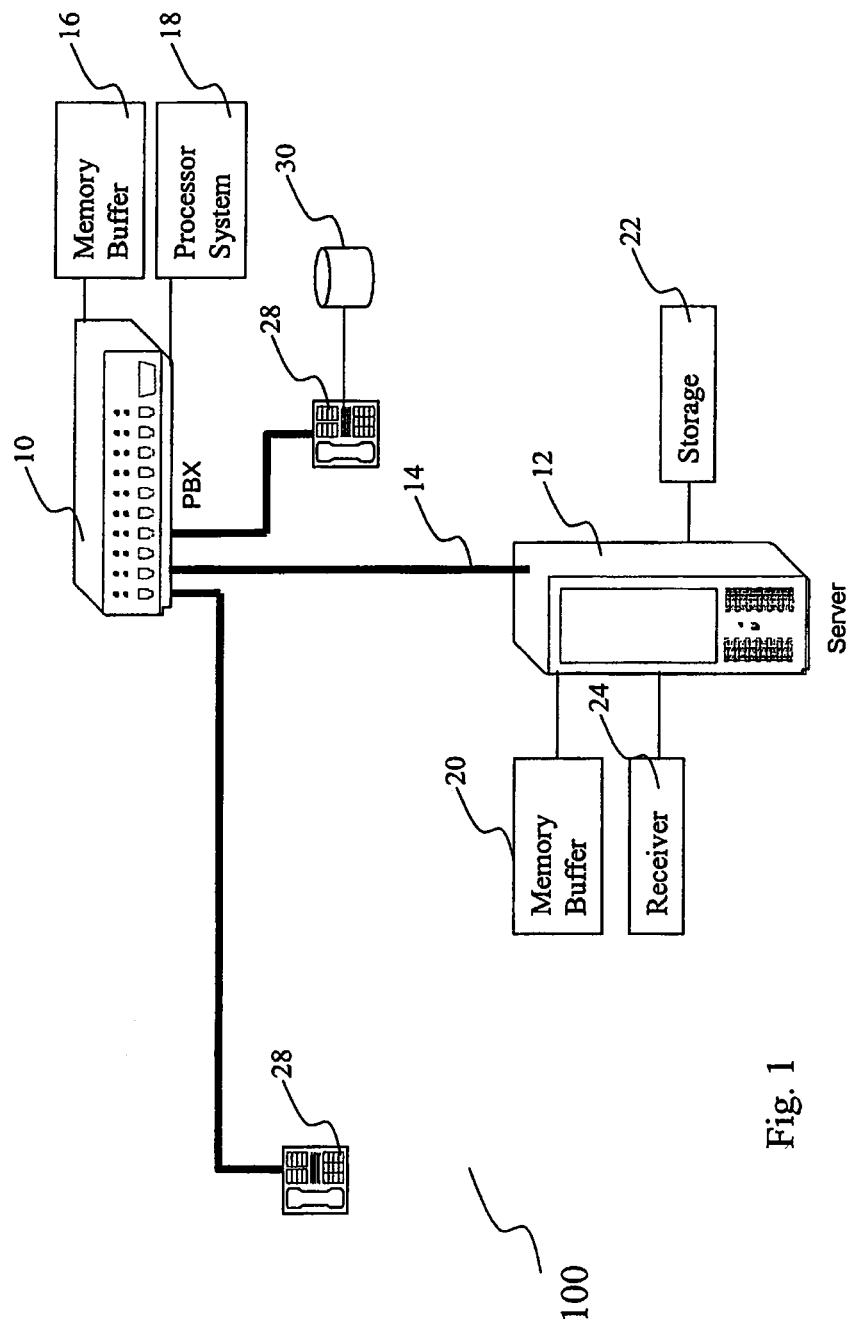
FIG. 1 illustrates a conventional telephone recording system using a centrally located exchange device.

Referring to FIG. 1, a centralized on-demand recording system 100 includes an centrally located exchange device 10 connected to a server 12 via a network 14. The centrally located exchange device 10 such as a PBX includes a memory buffer 16, such as RAM or a hard drive, a processor 18 for converting analog signals into digital signals, and for placing data into packets. While only one processor 18 is shown, it is contemplated that a processing system, composed of one or more processors in conjunction with firmware or software, could provide equivalent functionality. The server 12 includes a memory buffer 20, such as random access memory (RAM) or a hard drive, a storage device 22, such as a compact disk (CD-ROM) drive, floppy drive, or hard drive, and a device 24 for receiving a save initiation request. The centrally located exchange device 10 is connected to one or more communication devices 28 via the network 14. Communication devices 28 may be capable of transmitting or receiving analog or digital signals via the network 14. The network may be any type of wired or wireless system for transmission of signals, including, a plain old telephone switch (POTS) network, computer packet network, or television broadcast system.

Connected to at least one of the communication devices 28 is a save initiator 30, which allows a user to initiate a save request. While depicted in FIG. 1 as being connected to one of the communication devices 28, the save initiator 30 may instead (or in addition) be connected to any of the other components or may be a stand-alone component connected to the network, thus allowing the initiation of the save request by someone other than a user of the communication devices 28.

While two parties are engaging in a voice session, the corresponding voice data is duplicated and digitized by the processor 18 and may be placed into packets. The packets are then provided over the network and received by the server 12. The server 20 extracts (e.g., de-packetizes) the digitized information from the packets and stores the extracted information in the memory buffer 20. If a save request signal is initiated, the save initiator 30 transmits a save request signal for receipt by the receiver 24. When the connection is terminated, the contents of the memory buffer 20 on the server 20 is copied onto the storage device 22. The saved information of the entire connection on storage device 22 is made available for playback via devices such as the communication device 28.

In an enterprise environment wherein a complex telephone system is deployed, any number of telephones 28 may be connected to any number of line cards of the centrally located exchange device 10. The line cards may contain functional modules that deliver that functions equivalent to the memory module 16, digitizing processor and packetizing processor system 18.

Figure 2:
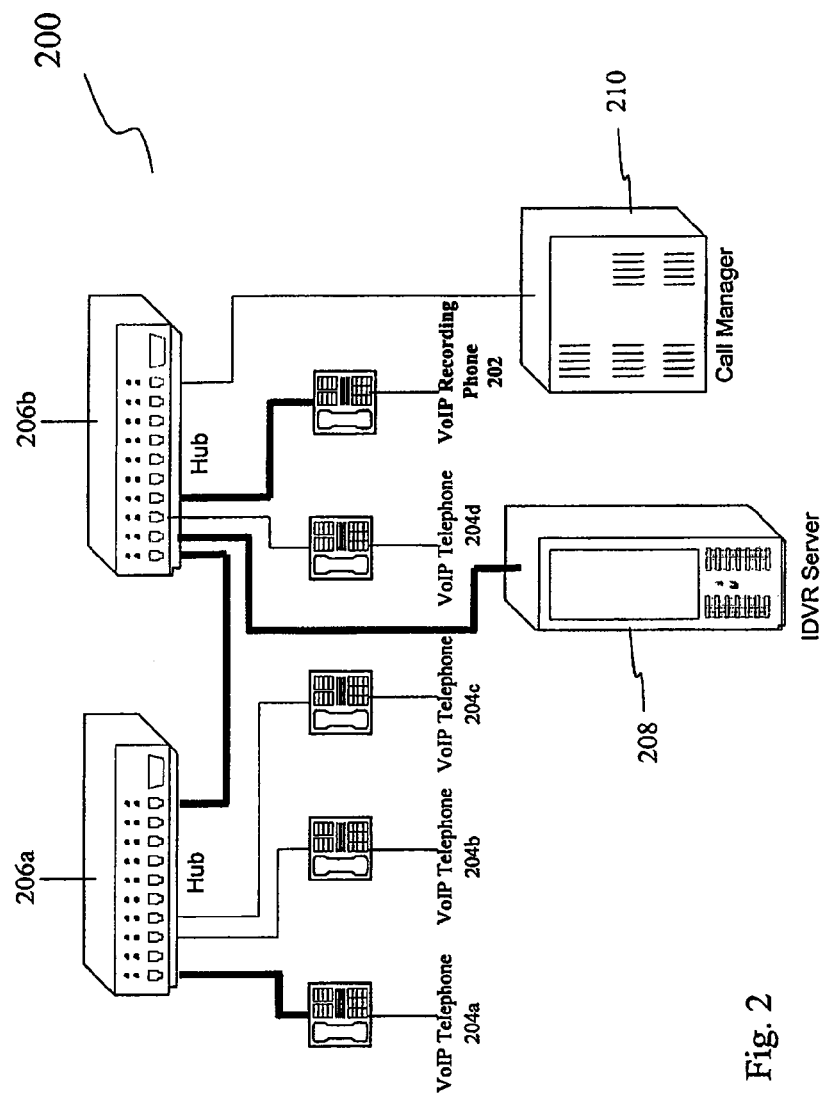
FIG. 2 illustrates a distributed recording system in a telecommunication network using a recording phone.

FIG. 2 is a graphic representation for a distributed Voice Over IP (VoIP) telephone network 200 including a telephone recording device such as a VoIP recording phone 202 other communication devices such as regular VoIP telephones 204a-d, which may not have the recording feature. Although only one VoIP recording phone 202 is shown, it is understood that a number of such phones can be connected to the network 200. It is assumed that telephones 204 a-c are connected to a hub device 206a, and telephone 204d and the recording telephone 202 are connected to another hub device 206b. The hub device 206a or 206b can be an Ethernet hub device that are normally used to connect various computing devices such as another hub device, a storage server such as an IDVR server 208, or a call control unit such as a call manager 210. The VoIP recording telephone 202 performs an on-demand recording process to process and send all voice data from any other telephone involved in a conversation therewith to the IDVR server for recording purposes without going through a centrally located exchange device (such as the server 12 of FIG. 1). The recording telephone 202 also obtains call control information from the call manager 210 without involving a centrally located exchange device.

When a voice session is established between two telephones transmitting voice data, while at least one of which is a VoIP recording telephone 202 and the other is a regular phone such as telephone 204a, the voice data initiated by telephone 204a goes to a local switch device such as the hub 206a, further through another hub 206b, and reaches the recording phone 202. The recording phone 202 will dynamically process and duplicate the voice data received. If the voice data is not already in digital form, it is digitized and packetized by the recording phone 202, and sent to the IDVR server 208. The IDVR server 208 will extract (e.g., de-packetize) the digitized voice data from the packets and store the data in a memory buffering device such as a memory module in the IDVR server. If needed, the voice data is further stored in a persistent memory device for future replay.

Figure 3:
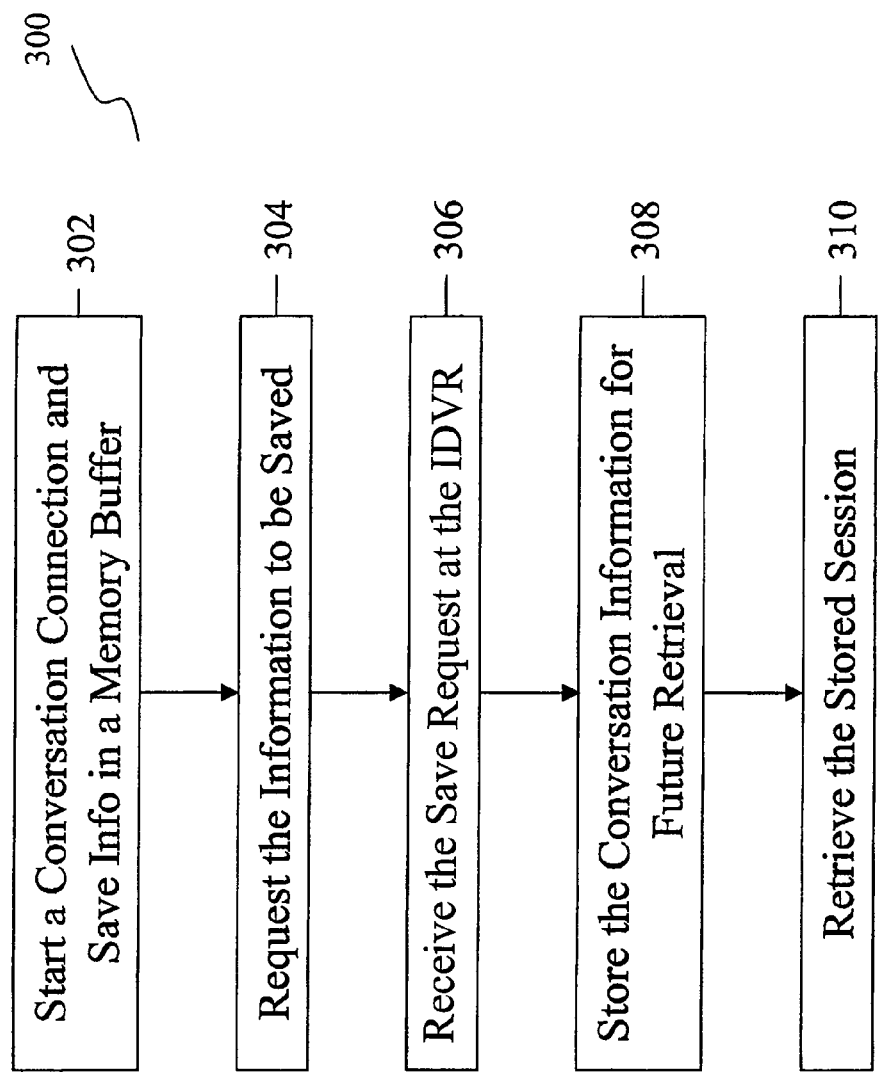
FIG. 3 illustrates a flow diagram for implementing the on-demand recording of a voice session according to one embodiment of the present invention.

FIG. 3 illustrates a flow diagram 300 for recording a voice session over a VoIP recording network 200. After a voice session is established in step 302, the voice data (either initiated by the recording phone or other noon-recording phone) is packetized by the VoIP recording phone 202 and sent to the IDVR server for temporary storage. A temporary memory buffering device such as a memory buffer of the IDVR server may be used to tentatively hold the stored information. At any time during the voice session and up until the session is terminated, the user of the recording phone 202 may request that the information of the entire voice session be saved for later retrieval by initiating a save request in step 304. To initiate the save request, the user may only need to push a predetermined button on the recording phone 202. Other user interfaces may also be possible to send the save request.

Although the VoIP recording phone is the instrument processes the save request, it is noted that it doesn't have to be the user of the VoIP recording phone who initiates the request, a user on the other end of the line using a regular VoIP telephone can also initiate the process by sending a notice to the VoIP recording phone. Since the packets are used as the transport means for information exchange, it should be understood by one skilled in the art that all other VoIP telephones can send a signal to the VoIP recording phone to request a conversation session to be saved. It should be noted, however, that the user of the VoIP telephone recording system does not necessarily have to be a user of a telephone 204a-d or 202. The user can use a computer terminal that can communicate with the VoIP recording phone. In step 306, the save request signal is sent to and received by the IDVR server. Upon receiving the instruction, the IDVR server stores all the voice data currently stored in the temporary memory module and any forthcoming voice data in a predetermined persistent storage device of the IDVR server for future retrieval (step 308). On the other hand, if the save request is never initiated before the end of the voice session, the voice data tentatively stored by the IDVR server will be deleted when the voice session ends. The user can retrieve the stored voice data at any time from the IDVR server through any compatible playback device such as a regular VoIP telephone (step 310). In this manner, regardless of when the save request is initiated during the session, the entire communication of the voice session is available for playback. It is also understood that the temporary memory buffering device does not need to be on the IDVR server, it can reside in the VoIP phone as well. If so, the VoIP recording phone processes the voice data and keeps it until it is clear whether the voice data needs to be sent to the IDVR server for storage. In other words, if the voice session ends without a save request ever issued, the VoIP phone discards the content tentatively saved thereon. The hubs shown can be replaced by switches if required, and the voice session can still be recorded based on the above described principles. FIG. 3 thus illustrates a distributed communication architecture (e.g., most likely within a company) wherein two or more people can start and record a peer-to-peer conversation without involving a centrally located exchange device such as a private branch exchange (PBX) or any similar devices.

Figure 4:
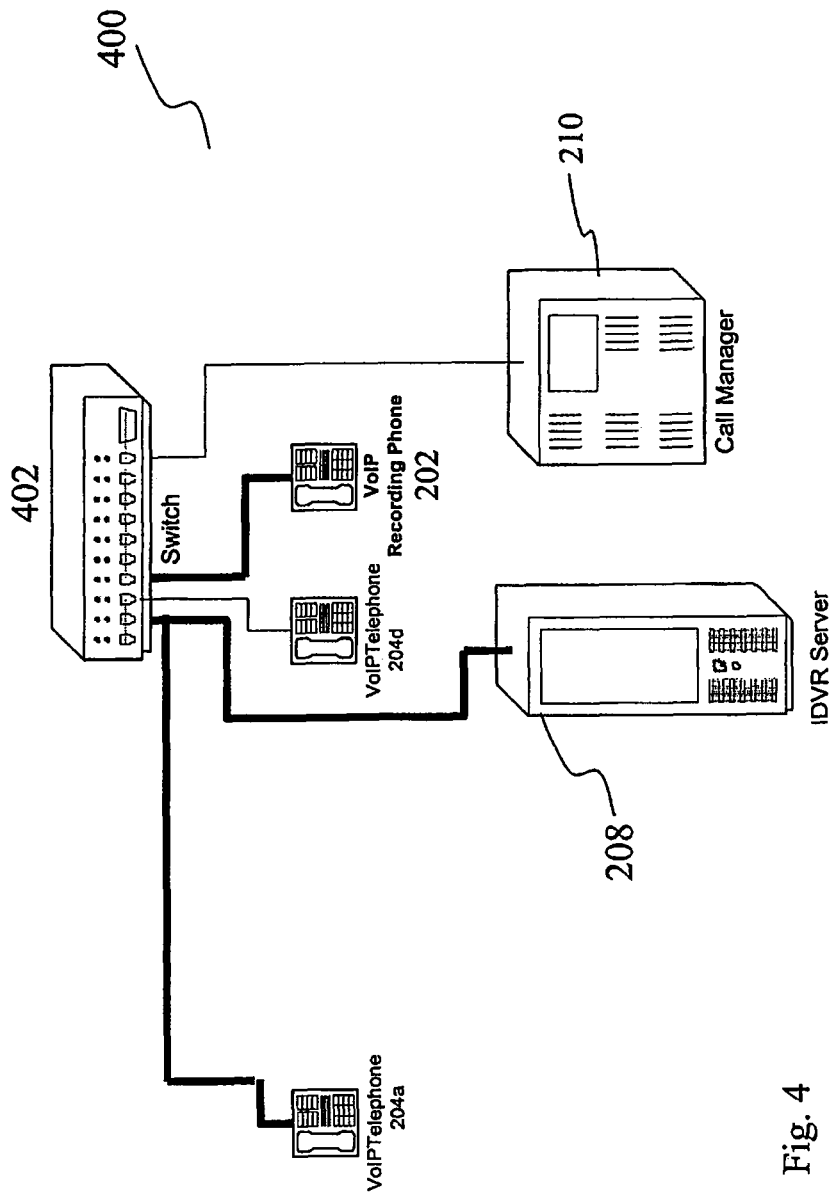
FIG. 4 illustrates a distributed recording system in a telecommunication network using a recording phone according to another embodiment of the present invention.

FIG. 4 illustrates a peer-to-peer VoIP telephone recording system 400 involving only one local switch device. The system 400 is similar to the system 200 of FIG. 2 except that only one switch 402 is involved. The switches, like the hubs, operate at the Ethernet level for the communication, and only serve the purpose of routing the packets from one end to the other of an established communication link. In this configuration, a voice session is carried out with voice data transmitted only through one single switch. No centrally located exchange device is involved at all.

Figure 5:
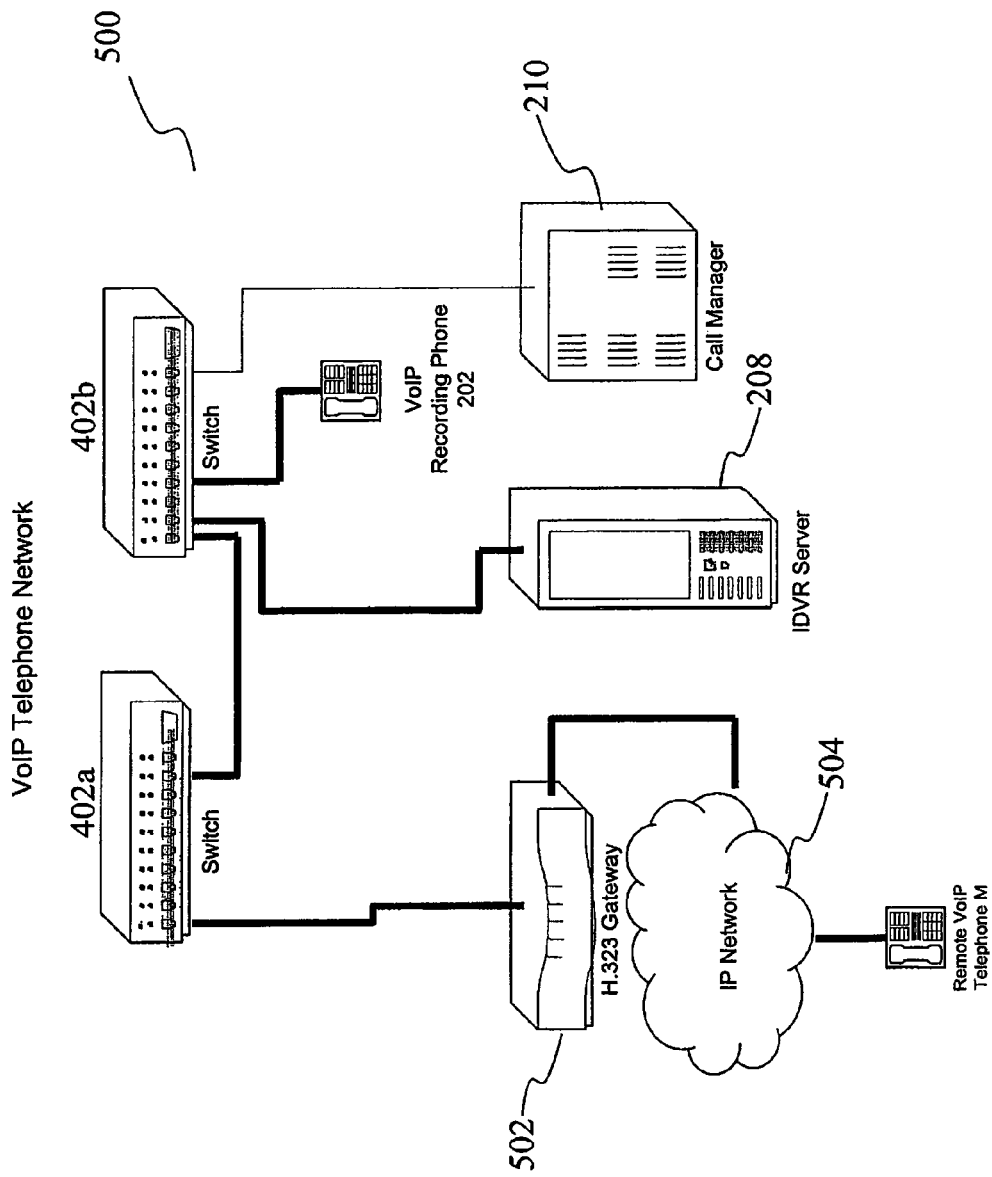
FIG. 5 illustrates a distributed recording system in a telecommunication network using a recording phone according to another embodiment of the present invention.

FIG. 5 illustrates a VoIP telephone recording system 500 according to another embodiment of the present invention. This system 500 connects a VoIP recording phone with a remote VoIP phone through a series of network devices such as the switches 402a-b, a gateway device 502, and an IP transport network 504. This illustrates that the voice recording mechanism as described with FIG. 3 can be extended to a much bigger network or even to multiple networks as long as one VoIP recording phone is operating together with an IDVR server 208 and a call manager 210, which manages the voice session. It is also understood that since the VoIP recording phone transmits packets to the IDVR server 208, the IDVR server does not have to be physically located in the same network or in the vicinity of the recording phone. As the packets can travel a long distance in a short time period, the IDVR server can actually be located in a different network.

The VoIP recording phone 202 shown in FIGS. 2-5 can be easily replaced by computing devices such as personal computers or personal digital assistants as long as such computer device has the VoIP recording telephone function. While packets are used in the preferred embodiment above, other forms of data transfer are commonly used by those skilled in the art, including, for example, frames, raw data, or tokens.

The present invention as described above thus provides an improved method for allowing the entire telephone conversation, and other streams of analog or digital data to be recorded when the triggering event to record the data is initiated during the transmission. It is also contemplated by the present invention that various components of the invention could be combined to reduce the number of components.

While the invention has been particularly shown and described with reference to the preferred embodiments thereof, it will be understood by those skilled in the art that various changes in form and detail may be made therein without departing from the spirit and scope of the invention, as set forth in the following claims.

The invention claimed is:

1. A system used for on-demand voice data recording, the system comprising:
   a network;
   at least one hub device coupled to the network;
   two or more communications devices coupled to the network through the at least one hub device, any given two of the two or more communication devices operable to establish a voice session between the given two communication devices through the at least one hub device;
   a computer terminal coupled to the network, the computer terminal operable to transmit to the network a notice including a save request signal related to a given voice session that is established on the network;
   a server coupled to the network, the server including a receiver, a memory buffer, and a persistent memory device, the server operable to automatically, upon initiation of the given voice session, temporarily store voice data representing the given voice session in the memory buffer, the server operable to receive the save request signal;
   wherein if the server receives the save request signal at any time while the given voice session is established and before the given voice session is terminated, the server is operable to save the voice data related to the entirety of the given voice session by copying the voice data from the memory buffer to the persistent memory device,
   wherein if the server does not receive the save request signal before the end of the given voice session, the server is operable to delete the voice data related to the given voice session from the memory buffer without copying the voice data to the persistent memory device, and
   wherein at least one of the two or more communication devices establishing the given voice session is a telephone recording device operable to dynamically process and duplicate the voice data included in the given voice session, and to send the duplicated voice data to the server during the given voice session.

2. The system of claim 1, wherein the saved voice data in the persistent memory device related to the given voice session is operable to be replayed at one or more time periods after the given voice session has been terminated.

3. The system of claim 1, further including:
   a playback device coupled to the server, the playback device operable to playback the voice data stored in the persistent memory device of the server.

4. The system of claim 3, wherein the playback device is a voice over IP telephone.

5. The system of claim 1, wherein dynamically processing the voice data includes digitizing and packetizing voice data from the given voice session.

6. The system of claim 5, wherein the server is operable to de-packetize the digitized voice data received from the telephone recording device to generate de-packetized data, and to store the de-packetized data.

7. The system of claim 1, wherein the server is located in a different network that is coupled to the network.

8. The system of claim 1, wherein at least one of the two or more communication devices establishing the given voice session is coupled to the at least one hub device through a different hub device coupled to the at least one hub device.

9. The system of claim 8, wherein the different hub device is coupled to the hub device through a gateway coupled to an IP network.

10. The system of claim 1, wherein the telephone recording device includes a button that, when pushed, is operable to cause the initiation and transmission of the save request signal.

11. A method for on-demand recording of a voice session established over a computer network, the method comprising:
   establishing a voice session over a computer network between a first communication device and at least one other communication device, the first communication device including VoIP recording telephone functionality,
   automatically temporarily storing voice data representing the voice session in a memory buffer device in a storage server, wherein the temporary storing is automatically initiated upon the establishment of the voice session and includes dynamically processing and duplicating the voice data included in the voice session,
   sending the duplicated voice data to the storage server during the voice session,
   wherein if a save request signal is received at any time while the voice session is established and before the voice session is terminated, saving the voice data related to the entirety of the voice session by copying the voice data from the storage server to a persistent memory device,
   wherein if the save request signal not received before the voice session is terminated, deleting the voice data related to the voice session from the storage server without copying the voice data to the persistent memory device.

12. The method of claim 11, further including:
   initiating and transmitting the save request signal when a button located at the first communication device is pressed.

13. The method of claim 11, further including:
   initiating and transmitting the save request signal from a save initiator coupled directly to the first communication device.

14. The method of claim 11, further including:
   retrieving from the persistent memory device, at some time period after saving the voice data and after termination of the voice session, the voice data associated with the entirety of the voice session, and playing back the voice data.

* * * * *